United States Patent [19]

Yasumura

[11] Patent Number: 4,736,283
[45] Date of Patent: Apr. 5, 1988

[54] REGULATED VOLTAGE CONVERTER WHICH HAS SUBSTANTIALLY FEWER PARTS THAN PRIOR ART DEVICES

[75] Inventor: Masayuki Yasumura, Kanagawa, Japan

[73] Assignee: Sony Corporation, Tokyo, Japan

[21] Appl. No.: 906,406

[22] Filed: Sep. 12, 1986

[30] Foreign Application Priority Data

Sep. 13, 1985 [JP] Japan ................. 60-203942

[51] Int. Cl.$^4$ ........................... H02M 3/335
[52] U.S. Cl. ........................... 363/19; 363/91
[58] Field of Search ............ 363/18, 19, 75, 80, 363/82, 90, 91; 323/250, 251

[56] References Cited

U.S. PATENT DOCUMENTS

| | | | |
|---|---|---|---|
| 3,582,754 | 6/1971 | Hoffmann et al. | 363/18 |
| 3,697,851 | 10/1972 | Mast | 363/19 |
| 4,065,713 | 12/1977 | Pollmeier | 363/19 |
| 4,084,219 | 4/1978 | Furukawa et al. | 363/19 |
| 4,301,498 | 11/1981 | Farrer | 363/90 X |
| 4,595,973 | 6/1986 | Masuda et al. | 363/18 |

Primary Examiner—Patrick R. Salce
Assistant Examiner—Marc S. Hoff
Attorney, Agent, or Firm—Hill, Van Santen, Steadman & Simpson

[57] ABSTRACT

An improved switching power source in which the output of the DC input power source is switched off and on under control of switching elements of an oscillating drive circuit which is supplied to the primary side of a power source transformer and from which a constant voltage output is supplied from the secondary of the transformer. A saturable reactor transformer supplies an input to the control terminals of the switching elements of the oscillating drive circuit and the inductance of the saturable reactor transformer is controlled with the output voltage from the secondary of the power source transformer so as to control the oscillating frequency of the oscillating drive circuit and, thus, stabilize the output voltage at the secondary of the power source transformer so as to obtain an increased conversion efficiency, reduce the size and weight of the transformer, reduce the leakage flux, improve the control range and reduce the cost of production.

10 Claims, 6 Drawing Sheets

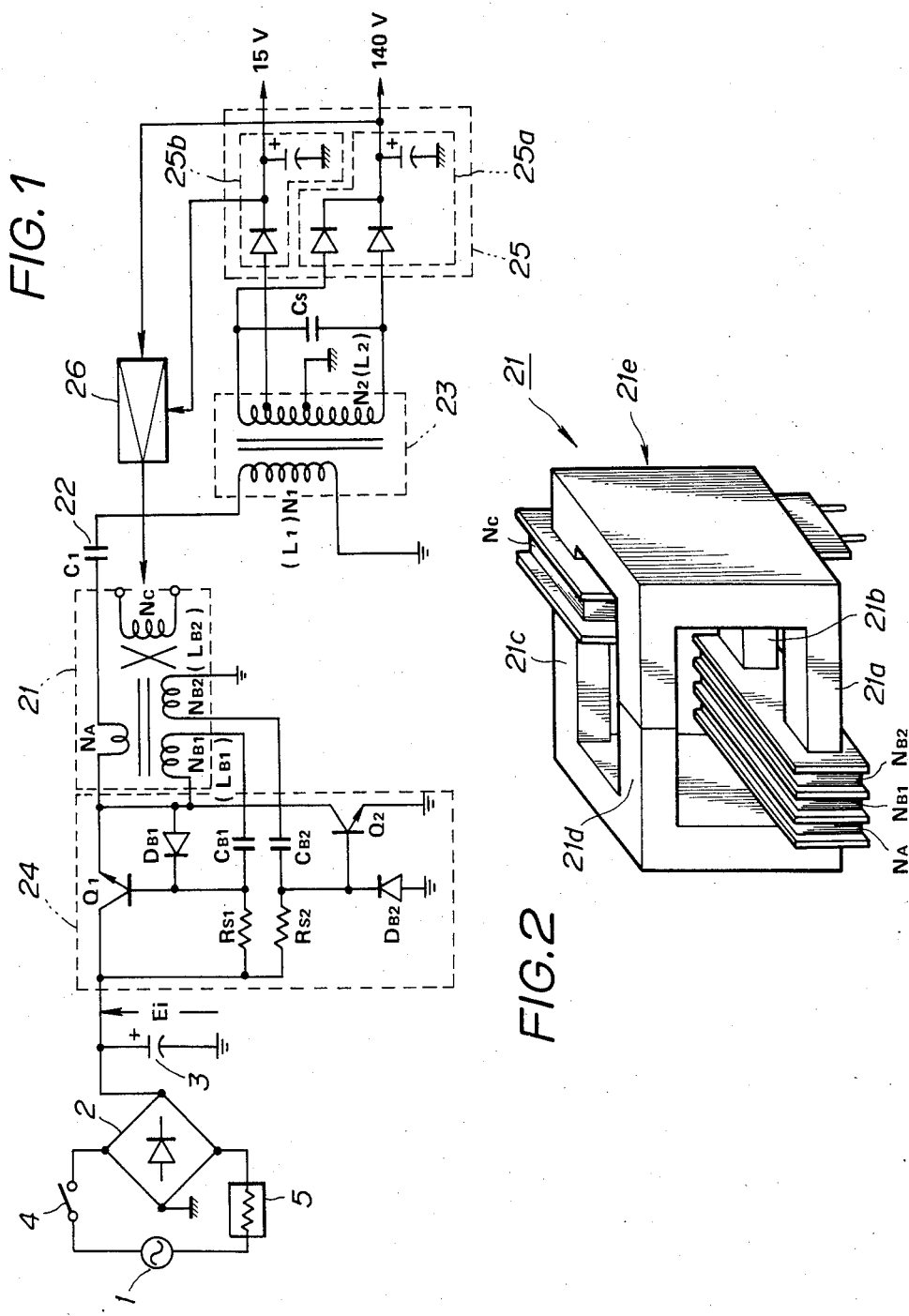

FIG.3A COLLECTOR VOLTAGE $V_{CE}$ OF TRANSISTOR $Q_1$
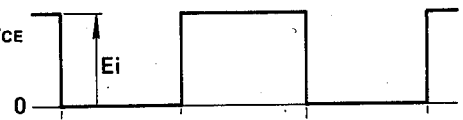
FIG.3B COLLECTOR VOLTAGE $V_{CE}$ OF TRANSISTOR $Q_2$
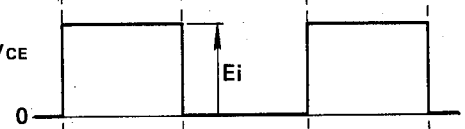
FIG.3C RESONANCE CURRENT OF SECONDARY WINDING $N_{B1}$
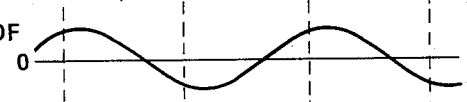
FIG.3D RESONANCE CURRENT OF SECONDARY WINDING $N_{B2}$
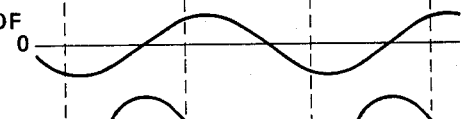
FIG.3E COLLECTOR CURRENT OF TRANSISTOR $Q_1$
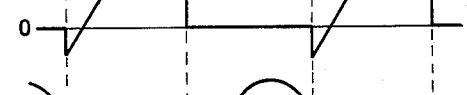
FIG.3F COLLECTOR CURRENT OF TRANSISTOR $Q_2$
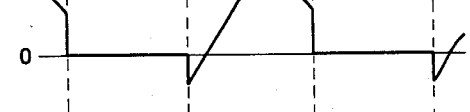
FIG.3G RESONANCE CURRENT OF PRIMARY WINDING $N_1$ OF POWER SOURCE TRANSFORMER 23
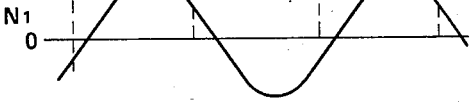

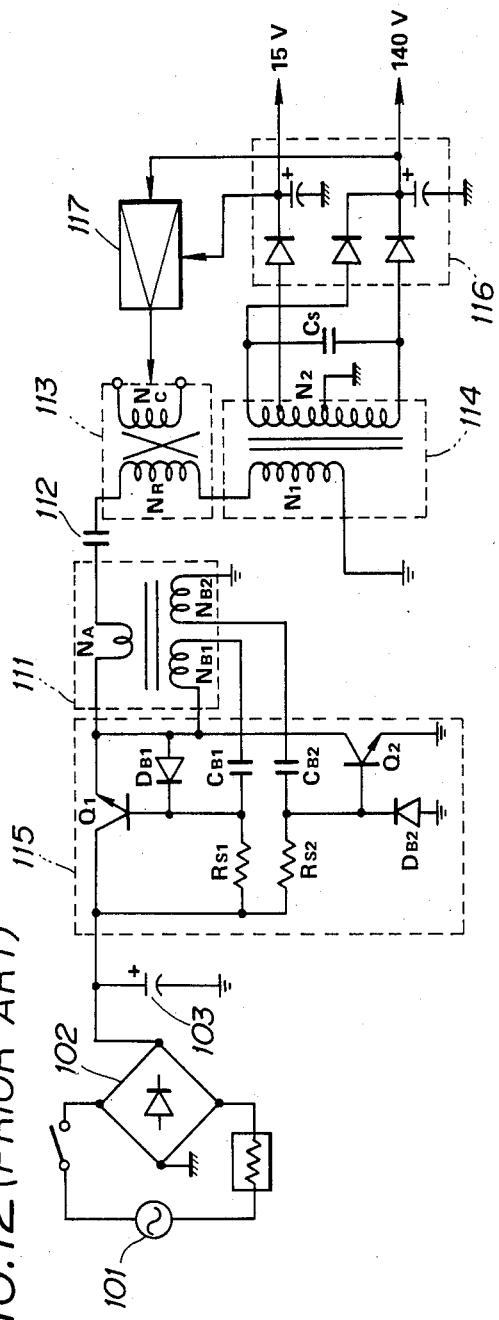
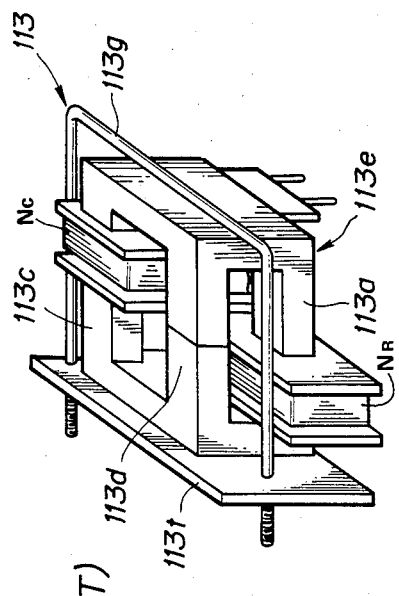
FIG.12 (PRIOR ART)
FIG.13 (PRIOR ART)

REGULATED VOLTAGE CONVERTER WHICH HAS SUBSTANTIALLY FEWER PARTS THAN PRIOR ART DEVICES

BACKGROUND OF THE INVENTION

1. Field of the Invention

This invention relates in general to a switching power source device so as to produce a stable output voltage. Particularly, it relates to a switching power source which is suitable for supplying large amounts of electrical power.

2. Description of the Prior Art

A variety of switching power source devices are known in which the DC input power source turns off and on in a controlled manner so that the desired constant voltage output is obtained from the power source transformer. An example of this kind of switching power source device is described in Japanese Patent Application Nos. 215854/1984 and 211841/1984 filed by the assignee of the present application. Such switching power source device is designed to be used with the saturable reactor transformer, and the series resonance impedance in the primary of the power source transformer is controlled depending upon the output voltage from the secondary so as to control the exciting current for stabilizing the output voltage.

FIG. 12 illustrates an example of a prior art switching electrical power source device wherein the DC input power source to the power source device is obtained by, for example, rectifying and smoothing the output of a commercial AC input power source 101 using a full rectifier 102 in a bridge diode configuration and a smoothing capacitor 103. The output from the DC input source is supplied through a transistor Q1 and a primary winding $N_A$ of a converter drive transformer 111 to a series resonance circuit comprising a capacitor 112, a controlled winding $N_R$ of a saturable reactor transformer 113 which controls the power and a primary winding $N_1$ of a power isolation transformer 114. The current of the input power source is turned off and on by a two transistor self-excited oscillating drive circuit 115 which includes a first switching transistor Q1 which has its base connected to a series resonance circuit consisting of a secondary winding $N_{B1}$ of the converter drive transformer 111 and a capacitor $C_{B1}$ and a second switching transistor Q2 which has its base connected to a series resonant circuit consisting of a secondary winding $N_{B2}$ of the transformer 111 and a capacitor $C_{B2}$.

The saturable reactor transformer 113 has the controlled winding $N_R$ and a control winding $N_C$ FIG. 13 illustrates the controlled winding $N_R$ wound so as to straddle two adjacent legs 113a and 113b of the four magnetic legs 113a through 113d of a magnetic core 113e. The control winding $N_C$ is wound so as to straddle, for example, the magnetic legs 113b and 113c and in a direction such that the long axis of the winding is orthogonal to the long axis of the winding $N_R$. The magnetic fluxes through the saturable reactor transformer 113 are controlled depending upon the control current supplied to the control winding $N_C$ so as to control magnetic fluxes through the transformer 113 and, thus, the inductance of the control winding $N_R$.

A parallel resonant capacitor $C_S$ and a rectifying smoothing circuit 116 are connected to the secondary winding $N_2$ of a power isolation transformer 114. The DC output voltage from circuit 116 is converted by a control circuit 117 into a control current which is supplied to the control winding $N_C$ of the saturable reactor transformer 113.

Thus, the inductance of the saturable reactor transformer 113 changes depending upon fluctuations in the DC output voltage and this changes the series resonance impedance in the primary winding of the power isolation transformer 114 so as to cause changes in the exciting current to control the DC output voltage to a constant value.

The switching power source device described has the disadvantages in that heat radiation from the saturable reactor transformer 113 makes it necessary as shown in FIG. 13 to provide a heat radiation plate 113f to the magnetic core 113e using a Ushaped bracket 113g which clamps the plate 113f to the shield case of the power source so as to provide heat radiation. Also, a large magnetic flux leakage occurs from the saturable reactor 113. The switching power source device has an AC-DC conversion efficiency which can reach an efficiency of 83–85% at the highest. It is desired to obtain higher conversion efficiency for switching power sources particularly when the load power exceeds approximately 100 watts.

SUMMARY OF THE INVENTION

It is the principal object of the present invention to provide a switching power source device in which the construction of the shield case of a power source block and for the heat radiation can be simplified so as to reduce the size and weight of the saturable reactor transformer so as to reduce the heat generated and the amount of flux leakage.

It is another object of the present invention to provide a switching power source device in which the saturable reactor transformer loss is minimized and in which the power conversion efficiency is approximately 90%.

A further object of the invention is to provide a switching power source device wherein the control range of the load and of the input fluctuations can be increased.

A feature of the present invention provides a switching power source device including a LC resonant circuit including a primary winding of a power source transformer which is connected to a DC input power source, an oscillating drive circuit which has a switching device for controlling current flowing in the LC resonant circuit to switch it off and on. The oscillating frequency of the oscillating drive circuit is controlled by a saturable reactor transformer connected to the control terminal side of the switching device and a control circuit is connected to control the inductance of the saturable reactor transformer according to the output voltage in the secondary of the power source transformer so as to variably control the oscillating frequency of the oscillating drive circuit.

The saturable reactor transformer makes it possible to control the oscillating frequency in the primary of the power source transformer according to the input or load fluctuations. The saturable reactor transformer can be reduced in size and weight. The leakage flux and the heat loss due to the saturable reactor transformer loss can be effectively reduced due to the small amplitude operation.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a circuit diagram showing an embodiment of the present invention;

FIG. 2 is a diagrammatic perspective view illustrating an example of a saturable reactor transformer;

FIG. 3 is a time base chart for explaining the operation of the invention;

FIG. 12 is a circuit diagram illustrating an example of the conventional switching power source device; and FIG. 13 is a diagrammatic perspective view illustrating a conventional saturable reactor transformer of the prior art.

DESCRIPTION OF THE PREFERRED EMBODIMENTS

Figure 4:
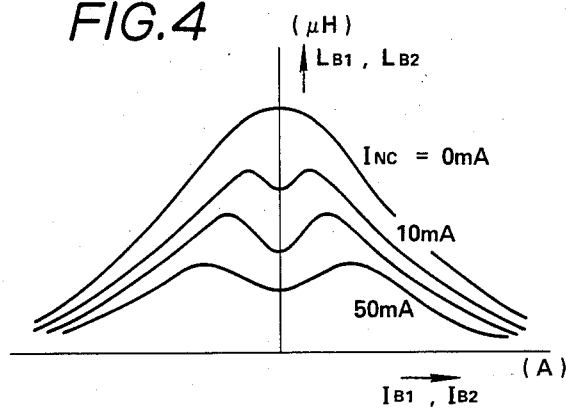
FIG. 4 is a chart showing the current voltage characteristics of the saturable reactor transformer.

A first embodiment of the present invention is illustrated in FIG. 1. The DC input source to the power source device is obtained by rectifying and smoothing a commercial AC input power source 1 with a full wave rectifier 2 in a diode bridge configuration and a smoothing capacitor 3. A power source switch 4 and a resistor 5 which limits the incoming current are connected in series between the AC input source 1 and the full wave rectifier 2.

The output from the DC input source is supplied through transistor Q1 and through a primary winding $N_A$ of a saturable reactor transformer 21 to a series resonant circuit comprising capacitor 22 and a primary winding $N_1$ of a power source transformer 23. The saturable reactor transformer 21 has a primary winding $N_A$ as well as two secondary windings $N_{B1}$ and $N_{B2}$ as well as a control winding $N_C$. As illustrated in FIG. 2, the primary winding $N_A$ and the two secondary windings $N_{B1}$ and $N_{B2}$ are wound so as to straddle two adjacent legs 21a and 21b of the four magnetic legs 21a through 21b of the magnetic core 21e. The control winding $N_C$ is wound so as to straddle the magnetic legs 21b and 21c and the long direction of this winding is orthogonal to the long direction of windings $N_A$, $N_{B1}$ and $N_{B2}$.

An oscillating drive circuit 24 is connected to the secondary windings $N_{B1}$ and $N_{B2}$ of the saturable reactor transformer 21 as shown and the oscillating drive circuit 24 turns the current of the input DC source on and off in a controlled manner. Circuit 24 comprises a series circuit including a transistor Q1 with a diode $D_{B1}$ connected between its emitter and base and a second transistor Q2 which has its collector connected to the emitter of transistor Q1 and its emitter connected to ground and its base connected to a diode $D_{B2}$ which has its other side connected to ground. The transistor Q1 is connected between the DC input power source Ei and the primary winding $N_A$ of the saturable reactor transformer 21 and the transistor Q2 is connected between the primary winding $N_A$ of the saturable reactor transformer 21 and ground. A series resonant circuit consisting of a secondary winding $N_{B1}$ of the saturable reactor transformer 21 and a capacitor $C_{B1}$ is connected between the emitter and base of the transistor Q1. A diode $D_{B1}$ is connected between the emitter and base of the transistor Q1.

The series resonant circuit consisting of the secondary winding $N_{B2}$ of the saturable reactor transformer 21 and a capacitor $C_{B2}$ are connected between the emitter and base of the transistor Q2. Startup resistors $R_{S1}$ and $R_{S2}$ are connected between the DC input power source and the base electrodes of the respective switching transistors Q1 and Q2. A parallel resonant capacitor $C_S$ and a rectifying smoothing circuit 25 are connected in the secondary winding $N_2$ of the power source transformer 23. The DC output voltage of the rectifying smoothing circuit 25 is converted by the control circuit 26 into a control current which is transmitted to the control winding $N_C$ of the saturable reactor transformer 21.

In operation, the so-called magnetic flux control type switching power source operates such that when the power source switch 4 is closed a voltage E1 of the DC input power source is supplied to the oscillating circuit 24 so that starting current flows in the base electrodes of the switching transistors Q1 and Q2 through the startup resistors $R_{S1}$ and $R_{S2}$ of the oscillating drive circuit 24 and the transistors Q1 and Q2 are energized to start the switching operation. During the steady state operation, the switching transistor Q1 is driven by the sinusoidal alternating current flowing in the secondary winding $N_{B1}$ through the series resonance circuit consisting of the capacitor $C_{B1}$ and the inductance of the secondary winding $N_{B1}$ of the saturable reactor transformer 21. As this current falls to zero, the switching transistor Q2 is driven and is turned on by the sinusoidal alternating current flowing in the secondary winding $N_{B2}$ through the series resonance circuit consisting of the inductance of the secondary winding $N_{B2}$ of the saturable reactor transformer 21 and the capacitor $C_{B2}$. The switching continues in an alternating manner as described above.

The control winding $N_C$ of the saturable reactor transformer 21 receives the output of the control circuit 26 which is the DC control current obtained by detecting the output voltage from the power source transformer 23. The control circuit output current flowing in the control winding $N_C$ of the saturable reactor transformer 21 controls the inductance of the secondary windings $N_{B1}$ and $N_{B2}$ which in turn controls the oscillating frequency of the oscillating drive circuit 24 in a fashion such that the DC output voltage from the power source transformer 23 will always be constant even in the event there are fluctuations in the load or in the DC input power source voltage $E_i$.

The collector voltage of the transistor Q1 changes as shown in FIG. 3A and the collector voltage of the transistor Q2 changes as shown in FIG. 3B. The sinusoidal AC currents flowing in the secondary windings $N_{B1}$ and $N_{B2}$ are shown in FIGS. 3C and 3D. The collector currents in the switching transistors $Q_1$ and $Q_2$ are respectively shown in FIGS. 3E and 3F. The current flowing in the primary winding $N_1$ of the power source transformer 23 is shown in FIG. 3G. Thus, it is seen that the current flowing in the primary winding $N_1$ of the power source transformer 23 has a sinusoidal waveform such as shown in FIG. 3G due to the series resonance between the capacitance value $C_1$ of the capacitor 22 and the inductance value $L_1$ of the primary winding $N_1$ of the power source transformer 23. The sinusoidal currents illustrated in FIGS. 3C and 3D are supplied as the base currents of the respective switching transistors $Q_1$ and $Q_2$ due to the series resonance of the values of inductances $L_{B1}$ and $L_{B2}$ of the secondary winding $N_{B1}$ and $N_{B2}$ and the capacitances of the capacitors $C_{B1}$ and $C_{B2}$ caused by the voltage induced by the above described series resonance current which flows in the primary winding $N_A$ of the saturable reactor transformer 21. Thus, assuming that $L_{B1}=L_{B2}$ and $C_{B1}=C_{B2}$, the switching frequency f of the switching power source device of the present embodiment is given by $$f = \frac{1}{2\pi\sqrt{L_{B1}C_{B1}}} = \frac{1}{2\pi\sqrt{L_{B2}C_{B2}}}$$

Figure 5:
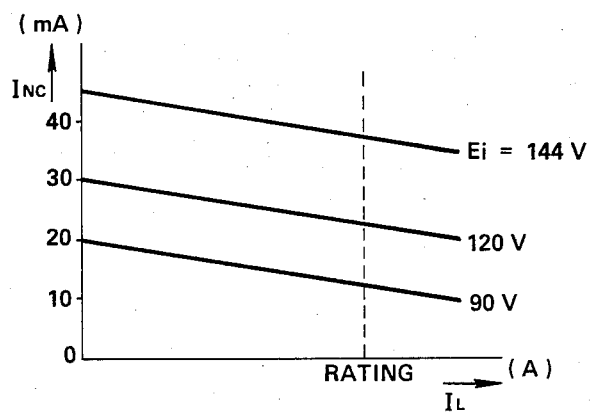
FIG. 5 is a chart showing control operation characteristics of load current with fluctuations of input current.
Figure 6:
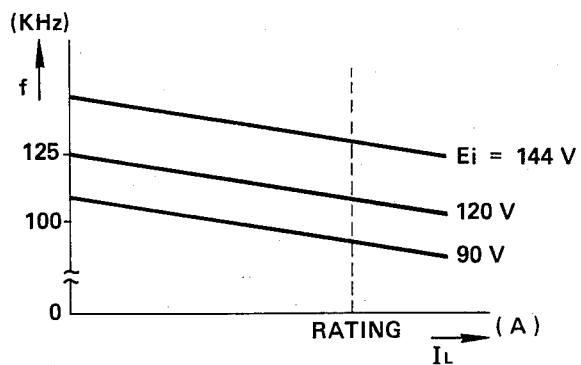
FIG. 6 is a chart showing the operation characteristic of load current and input frequency.

It is noted that when the core gap of the saturable reactor transformer 21 which has the orthogonal configuration shown in FIG. 2 is provided only in one leg the relation between the currents $I_{B1}$ and $I_{B2}$, respectively flowing in the secondary winding $N_{B1}$ and $N_{B2}$ of the saturable reactor transformer 21 and in the inductances $L_{B1}$ and $L_{B2}$ are changed by the DC control current $I_{NC}$ to the control winding $N_C$ in the manner illustrated in FIG. 4. Thus, when the control circuit 26 is designed such that the DC control current $I_{NC}$ is controlled according to changes in the load current $I_L$ in the secondary side of the power source transformer 23 as shown in FIG. 5 or to fluctuations in the voltage $E_i$ of the DC input power source obtained by rectifying and smoothing the voltage of the AC input source 1, the oscillating frequency f of the oscillating drive circuit 24 will be controlled according to changes in the load current $I_1$ or according to fluctuations in the input voltage $E_i$ as shown in FIG. 6.

Figure 7:
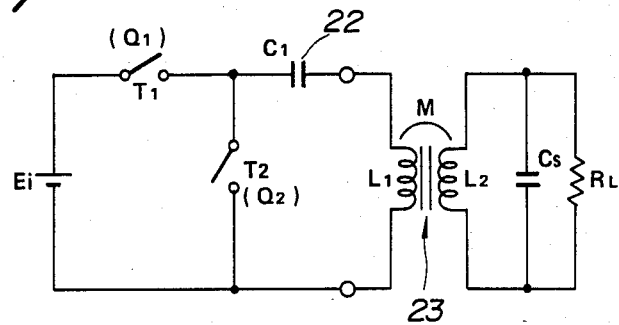
FIG. 7 is an equivalent circuit diagram of the switching power source circuit.
Figure 8:
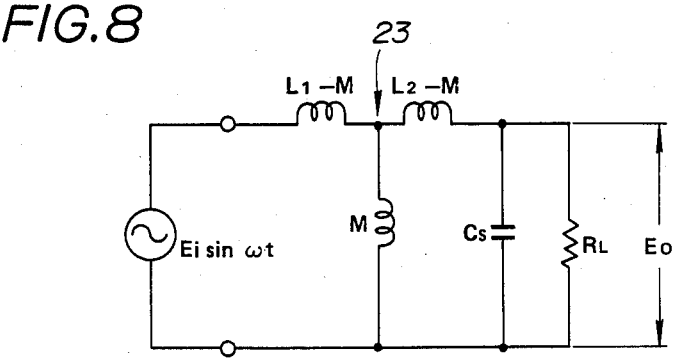
FIG. 8 is an equivalent circuit of the switching power source circuit.

FIG. 7 illustrates an equivalent circuit in which the switching transistor $Q_1$ and $Q_2$ of the oscillating drive circuit are replaced by switches $T_1$ and $T_2$. Since the switching circuit in the primary side of the power oscillation transformer 23 may be considered as a converting circuit which causes the sinusoidal AC current of the oscillating frequency f to flow in the primary winding $N_1$, it can be substituted by a high frequency AC power source to give the equivalent circuit illustrated in FIG. 8. In FIGS. 7 and 8, $L_1$ and $L_2$ represent inductances of the primary and secondary windings $N_1$ and $N_2$ of the isolation transformer 23 and M represents the mutual inductance between these windings. $R_L$ represents the load resistance of the secondary side of the isolation transformer 23. It is to be noted that the effective value $E_0$ of the AC output voltage $E_{AC}$ obtained from the high frequency AC power source in the equivalent circuit of FIG. 8 is given by $$E_0 = \frac{\pi}{2\sqrt{2}} \cdot$$

-continued
$$\frac{E_i}{\omega\sqrt{L_1L_2} \cdot \frac{1-k^2}{k} \sqrt{\frac{1}{R_L^2} + \left(\omega C_s - \frac{1}{\omega L_2(1-k^2)}\right)^2}}$$

The maximum effective value $E_{0MAX}$ is obtained when the parallel resonance frequency $f_0$ is equal to the switching frequency f. The parallel resonance $f_0$ is given $$f_0 = \frac{1}{2\pi\sqrt{L_2C_s(1-k^2)}}$$

such that the maximum effective value $E_{0MAX}$ is given by $$E_{0max} = \frac{R_LE_i}{Kf}\left(\frac{k}{\sqrt{L_1L_2}\,(1-k^2)}\right) = K'\frac{R_LE_i}{f}$$

Figure 9:
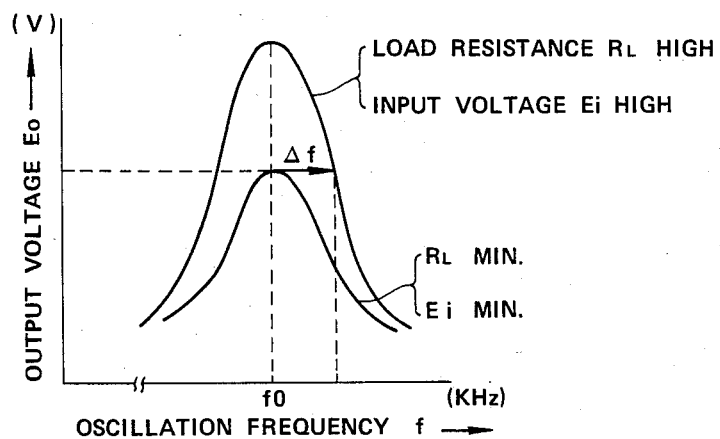
FIG. 9 is a chart which shows the changes in the output voltage in relation to the oscillating frequency.

K and K' are constants and $k = M/L_1L_2$. Thus, the operation of the frequency control so as to maintain a constant output voltage independent of changes in the load resistance $R_L$ and the DC input voltage $E_i$ as shown in FIG. 6 is correctly expressed by this formula. That is so as to provide the maximum load power shown in FIG. 9 the switching frequency f is set so that it is equal to the parallel resonance frequency. In case of light loads or large input voltage, the frequency is changed $\Delta f$ to control the DC output voltage to maintain a constant value.

If it is assumed that when a first rectifying smoothing circuit 25a for producing 140 volts DC output and a second rectifying smoothing circuit 25b for producing 15 volts DC output are used as a rectifying smoothing circuit 25 which is connected to the secondary side of the power source transformer 23, the switching power source device for supplying an electrical power of 155W which is the sum of the output load power from the first circuit 25a which is equal to 140W and the output load power from the second circuit 25b which is equal to 15W operates under the conditions that the voltage from the AC input source 1 fluctuates in a range from 90 to 144 volts.

When such conditions are to be satisfied in the prior art switching circuit shown in FIG. 12, the switching frequency f is set so that f =50 kHz because the core loss of the saturable reactor transformer 113 will be increased with frequencies higher than 50 kHz and the frequency f should be set within a range from 40–50 kHz. It is to be noted that with the use of type U-16 or FE-2 ferrite cores as the magnetic core of the converter drive transformer 111, it is required that an orthogonal core having a size of 8 mm×8 mm in cross-section must be used as the magnetic core 113e of the saturable reactor transformer 113. Also, a 35 turn winding formed by a bundle of 43 fine core wires each 0.1 mm in diameter must be applied to the controlled winding $N_R$ and a heat radiating plate 113f must be attached to the magnetic core 113e by U-shape bracket 113g as shown in FIG. 13 and clamped to a shield case of the power source block so as to radiate the heat produced by the core losses. Our experiments have shown that when the conventional switching power source device is constructed under these conditions, the AC to DC conversion efficiency reaches 83% for AC power voltage of 100 volts.

In contrast, in the switching power circuit of the invention previously described, the saturable reactor transformer 21 is used for controlling the oscillating frequency of the oscillating drive circuit 24 and the core losses in the high frequency range are low due to the small amplitude operation. Thus, even under the previously given conditions, the frequency condition f can be set so as to be in the range of from 100–150 kHz or higher. In this case, it is only necessary that the orthogonal core of the type FE-3 material having the size of 6 mm ×6 mm in cross-section be used for the saturable reactor transformer 21 and a 7-turn winding consisting of a bundle of 17 fine core wires each 0.1 mm in thickness can be used for each of the windings $N_A$, $N_{B1}$ and $N_{B2}$. Thus, the size and weight of the saturable reactor transformer 21 can be reduced while a sufficiently reliable heat radiation can be achieved using natural cooling in the present invention. Our experiences have shown that the AC to DC conversion efficiency with the invention can be raised to 90% for AC voltage of 100 volts.

Figure 10:
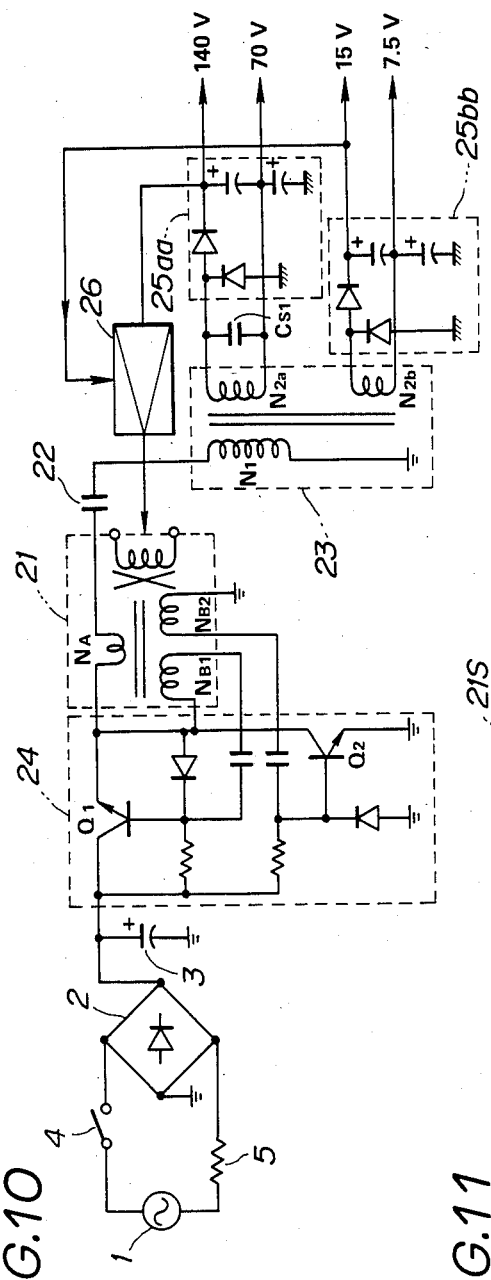
FIG. 10 is a circuit diagram illustrating a modified embodiment of the invention.

FIG. 10 illustrates a second embodiment of the invention wherein two secondary windings $N_{2A}$ and $N_{2B}$ are provided in the secondary of the power source transformer 23. A first double voltage full wave rectifying smoothing circuit 25aa is connected to the secondary winding and a second double voltage full wave rectifying smoothing circuit 25bb is connected to the secondary winding $N_{2b}$. Most of the construction of the second embodiment other than this feature including the two secondary windings $N_{2a}$ and $N_{2b}$ are identical to the embodiment illustrated in FIG. 1 and their description will not be repeated.

In the second embodiment shown in FIG. 10, since the number of turns of each of the second windings $N_{2a}$ and $N_{2B}$ is one-half that of the secondary winding $N_2$ in FIG. 1 the size of the power source transformer 23 can be reduced. Additionally, as many as four different output voltages such as 140 volts, 70 volts, 15 volts and 7.5 volts can be obtained at the outputs of the double voltage full wave rectifier smoothing circuits 25aa and 25bb as illustrated.

Figure 11:
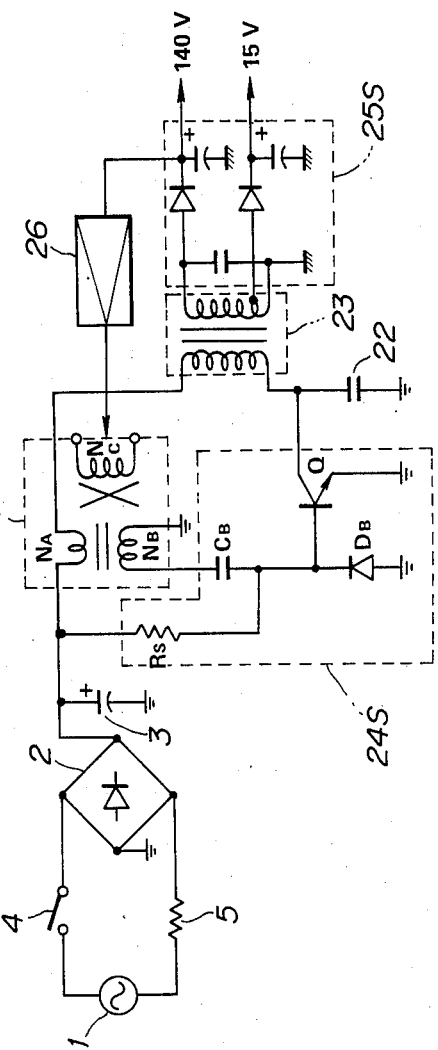
FIG. 11 is a circuit diagram illustrating an additional modified embodiment of the present invention.

Although the push-pull circuit including two switching transistors Q1 and Q2 is used as the oscillating drive circuit 24 it is possible to use an oscillating drive circuit 24S which includes only one switching transistor Q when only a small supply power to the load is required and this is shown in the third embodiment illustrated in FIG. 11.

In FIG. 11, the saturable reactor transformer 21S includes a primary winding $N_A$, a secondary winding $N_B$ and a control winding $N_C$. A series resonance circuit consisting of the secondary winding $N_B$ and a capacitor $C_B$ of the oscillating drive circuit 24S is connected to the base of the switching transistor Q. A diode $D_B$ is connected between the emitter and base of the switching transistor Q. A startup resistor $R_S$ is connected between the base of the switching transistor Q and the DC input power source. A halfwave rectifying smoothing circuit 25S is connected in the secondary side of the power source transformer 23. As can be seen by comparison with the circuit of the embodiment of FIG. 1 the other components are the same as illustrated in FIG. 1 and the description thereof will not be repeated.

The switching power source device of the present invention provides that the saturable reactor transformer is used for controlling the oscillating frequency of the oscillating drive circuit which is adapted for switching the primary side current to provide for high frequency small amplitude operation, reduction in the size and in the weight of the saturable reactor transformer and reduces the core loss and enhances the control range and, thus, provides cheaper high performance power source devices. Since the saturable reactor transformer is driven with a small current, the leakage flux of the saturable reactor transformer is reduced and the shield casing of the power source block is simplified as compared to the conventional casing which is constructed of aluminum which is 2 mm in thickness and the invention allows an iron plate casing which is 1 mm in thickness. Also, transformer singing can be eliminated since the saturable reactor transformer does not have to be connected to the shield casing. The saturable reactor transformer 21 may have its core formed from baked ferrite generally in the form of a cube or a parallelepiped, said core consisting of two core halves each consisting in turn of a square-plate core base and four magnetic legs extending from the four corners of the core base with the ends of the magnetic legs of the core halves abutting one another, said primary winding and the secondary winding in transformer coupling therewith and wound on first and second adjoining magnetic legs, a control winding wound on said second and third magnetic legs and said primary winding has an orthogonal orientation with respect to said secondary winding, and the direct current flowing in said control winding is controlled as a function of the output voltage.

Although the invention has been described with respect to preferred embodiments, it is not to be so limited as changes and modifications can be made which are within the full intended scope of the invention as defined by the appended claims.

I claim:

1. A switching power source device comprising: a D.C. input power source, an output terminal, a power source transformer having a primary winding and a secondary winding, said secondary winding of said power source transformer connected to said output terminal; an LC resonance circuit including a primary winding of said power source transformer, a saturable reactor transformer connected to said LC resonant circuit and having a control winding, an oscillating drive circuit connected to said D.C. input power source and supplying an output to said saturable reactor transformer and including switching means for controlling the current flowing in said LC resonance circuit to turn it on and off, the oscillating frequency of the oscillating drive circuit controlled by said saturable reactor transformer, and a control circuit connected to the output voltage at said output terminal at said secondary winding of said power source transformer and supplying an output to said control winding of said saturable reactor transformer so as to variably control the oscillating frequency of said oscillating drive circuit.

2. A switching power source device according to claim 1, wherein said saturable reactor transformer has a primary winding and first and second secondary windings and said primary winding of said saturable reactor transformer is connected in series with said LC resonance circuit and said first and second secondary windings are connected to said oscillating drive circuit.

3. A switching power source device according to claim 1, wherein the resonance frequency of the LC resonance circuit is selected so as to be equal to or lower than the minimum oscillating frequency of said oscillating drive circuit and wherein the output voltage is lowered with increases in the oscillating frequency.

4. A switching power source device according to claim 2, wherein the saturable reactor transformer has its core formed from baked ferrite generally in the form of a cube or a parallelpiped, said core consisting of two core halves each consisting in turn of a square-plate core base and four magnetic legs extending from the four corners of the core base with the ends of the magnetic legs of the core halves abutting one another, said primary winding of said saturable reactor transformer and said first and second secondary windings in transformer coupling therewith and wound on first and second adjoining magnetic legs, a control winding wound on said second and third magnetic legs and said primary winding has an orthogonal orientation with respect to said first and second secondary windings, and the direct current flowing in said control winding is controlled as a function of the output voltage.

5. A switching power source device according to claim 2, where in the switching means includes two switching elements connected in series with each other which are turned on and off differentially, the output of the switching means is supplied from the junction point of said switching elements to said primary winding of said saturable reactor and the LC resonance circuit is coupled to said primary winding of said saturable reactor.

6. A switching power source device according to claim 5, wherein the LC resonance circuit is formed by a series resonance circuit consisting of said primary winding of the power source transformer and a first capacitor.

7. A switching power source device according to claim 6, wherein said two switching elements are connected to said first capacitor.

8. A switching power source device comprising:
an input d.c. power source, an oscillating switching circuit connected at the output of said input d.c. power source, a saturable reactor transformer with first, second, third and fourth windings and said first winding receiving the output of said oscillating switching circuit, said second and third windings connected to supply inputs to said oscillating switching circuit, a power source transformer with primary and secondary windings, and a capacitor connected in series between said primary winding and said first winding, and a control circuit connected between the secondary winding of said power source transformer and said fourth winding of said saturable reactor transformer.

9. A switching power source device according to claim 8, wherein said saturable reactor transformer is formed with a magnetic core which has four parallel legs and said first, second and third windings are wound about the second and third legs, and said fourth winding are wound about said first and second legs.

10. A switching power source device comprising: an input D.C. power source, an oscillating switching circuit connected to the output of said input power source, a saturable reactor transformer with first, second and thrid windings and said first winding receiving the output of said oscillating switching circuit, a capacitor connected to said first winding, a power source transformer with primary and secondary windings with one end of said primary winding connected to said capacitor,

* * * * *